United States Patent
Kashimoto (10) Patent No.: US 9,613,625 B2
(45) Date of Patent: Apr. 4, 2017

(54) DATA INPUT DEVICE, DATA INPUT METHOD, STORAGE MEDIUM, AND IN-VEHICLE APPARATUS

(71) Applicant: Panasonic Intellectual Property Management Co., Ltd., Osaka (JP)

(72) Inventor: Kazutoshi Kashimoto, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 10 days.

(21) Appl. No.: 14/618,214

(22) Filed: Feb. 10, 2015

(65) Prior Publication Data

US 2015/0243277 A1 Aug. 27, 2015

(30) Foreign Application Priority Data

Feb. 24, 2014 (JP) ................. 2014-032688

(51) Int. Cl.

| G10L 21/00 | (2013.01) |
|---|---|
| G10L 15/22 | (2006.01) |
| G10L 15/19 | (2013.01) |
| G10L 15/06 | (2013.01) |
| G10L 15/08 | (2006.01) |
| G06F 3/023 | (2006.01) |

(52) U.S. Cl.
CPC ............ *G10L 15/22* (2013.01); *G10L 15/06* (2013.01); *G10L 15/08* (2013.01); *G10L 15/19* (2013.01); *G06F 3/0237* (2013.01); *G10L 2015/226* (2013.01); *G10L 2015/228* (2013.01)

(58) Field of Classification Search
CPC .................. G10L 2015/226; G10L 2015/228
USPC ......................... 704/243, 270, 275
See application file for complete search history.

(56) References Cited

U.S. PATENT DOCUMENTS 5,937,380 A * 8/1999 Segan ............... G10L 15/22
                                                704/235
7,149,970 B1 * 12/2006 Pratley ............ G06F 17/273
                                                704/10

(Continued)

FOREIGN PATENT DOCUMENTS

| JP | 2005-182208 | 7/2005 |
| WO | 2008/032169 | 3/2008 |

OTHER PUBLICATIONS

The Extended European Search Report from European Patent Office (EPO) dated Jul. 15, 2015 for the related European Patent Application No. 15154586.0.

*Primary Examiner* — Shaun Roberts
(74) *Attorney, Agent, or Firm* — Greenblum & Bernstein, P.L.C.

(57) ABSTRACT

A dynamic speech recognition dictionary generating unit extracts, from phrases stored in a speech recognition dictionary, phrases of which heads match a head of a character string inputted through a character string input unit and generates a dynamic speech recognition dictionary that stores difference phrases that are each part of an extracted phrase excluding a common phrase that is common among the extracted phrases. A speech recognition unit carries out recognition of a user utterance by using the dynamic speech recognition dictionary. An input character string confirming unit confirms an input character string candidate that includes a recognized difference phrase as an input character string.

6 Claims, 4 Drawing Sheets

(56) References Cited

U.S. PATENT DOCUMENTS

| | | | |
|---|---|---|---|
| 8,498,864 B1* | 7/2013 | Liang | G10L 15/22 369/25.01 |
| 2004/0049388 A1 | 3/2004 | Roth et al. | |
| 2005/0131686 A1 | 6/2005 | Yamamoto et al. | |
| 2007/0032225 A1* | 2/2007 | Konicek | H04M 1/72513 455/417 |
| 2007/0100619 A1* | 5/2007 | Purho | G06F 3/0237 704/239 |
| 2008/0195388 A1 | 8/2008 | Bower et al. | |
| 2008/0235029 A1* | 9/2008 | Cross | G10L 15/22 704/275 |
| 2008/0282154 A1 | 11/2008 | Nurmi | |
| 2009/0055174 A1* | 2/2009 | Han | G06F 3/0233 704/235 |
| 2010/0031143 A1* | 2/2010 | Rao | G06F 3/0237 715/261 |
| 2010/0191520 A1* | 7/2010 | Gruhn | G06F 3/0237 704/9 |
| 2013/0253933 A1* | 9/2013 | Maruta | G10L 15/00 704/246 |
| 2014/0106726 A1* | 4/2014 | Crosbie | H04W 4/046 455/418 |

\* cited by examiner

DATA INPUT DEVICE, DATA INPUT METHOD, STORAGE MEDIUM, AND IN-VEHICLE APPARATUS

CROSS REFERENCES TO RELATED APPLICATIONS

This application claims priority to Japanese Patent Application No. 2014-032688, filed on Feb. 24, 2014, the contents of which are hereby incorporated by reference.

BACKGROUND

1. Technical Field

The present disclosure relates to data input technology in which character string input devices that accept input entered manually through a touch panel or by operating keys or the like are combined with a speech recognition function.

2. Description of the Related Art

Among conventional data input devices in which character string input devices that accept manually entered input are combined with a speech recognition function, a data input device that predicts character string candidates to be inputted from a manually inputted character and that carries out speech recognition while a target phrase to be recognized is narrowed down to the predicted character string candidates is known (refer, for example, to Japanese Unexamined Patent Application Publication No. 2005-182208).

SUMMARY

With the conventional data input device, however, a user needs to utter a character string that has already been inputted through the character string input device.

In addition, the accuracy of speech recognition cannot be improved even if a target phrase to be recognized is narrowed down to the predicted character string candidates, if a number of candidates that contain a common phrase are predicted as the character string candidates.

For example, the following case is considered. A user wants to go to "ABC Bank D Branch" by car, but the car starts to move off when the user has finished inputting "ABC" into an in-vehicle apparatus. The in-vehicle apparatus is then switched to a voice input mode since the user is unable to input the remaining characters through keys. In this case, in the in-vehicle apparatus, for example, "ABC Bank D Branch," "ABC Bank E Branch," and "ABC Bank F Branch" are displayed as character string candidates.

The user then needs to say "ABC Bank D Branch" including "ABC" that has already been inputted.

The predicted character string candidates include "ABC Bank," or a common phrase. Since large part of each of the character string candidates consists of the common phrase, even if a target phrase to be recognized is narrowed down to the character string candidates, the accuracy of speech recognition cannot be improved.

One non-limiting and exemplary embodiment provides a data input device that makes it unnecessary for a user to utter a character string that has already been inputted and that improves the accuracy of speech recognition by narrowing down a target phrase to be recognized.

Additional benefits and advantages of the disclosed embodiments will be apparent from the specification and Figures. The benefits and/or advantages may be individually provided by the various embodiments and features of the specification and drawings disclosure, and need not all be provided in order to obtain one or more of the same.

In one general aspect, the techniques disclosed here feature a data input device that includes two input units including a character string input unit that accepts a character string and a voice input unit that accepts voice input, a display unit that displays a character string, and a speech recognition dictionary. The data input device further includes a dynamic speech recognition dictionary generating unit that extracts, from phrases stored in the speech recognition dictionary, phrases of which heads match a head of a character string inputted through the character string input unit and generates a dynamic speech recognition dictionary that stores difference phrases that are each part of an extracted phrase excluding a common phrase that is common among the extracted phrases, a display controlling unit that displays, on the display unit, phrases of which heads match a head of a character string inputted through the character string input unit with difference phrases being highlighted, a speech recognition unit that carries out speech recognition of voice inputted through the voice input unit by using the dynamic speech recognition dictionary, and an input character string confirming unit that confirms an input character string candidate that includes a difference phrase recognized by the speech recognition unit as an input character string.

It is to be noted that a character string herein includes a single character. A phrase stored in the speech recognition dictionary corresponds to a character string that forms a unit of speech recognition. Highlighting includes displaying a given character string in a different color, in a different size, or in a different typeface, blinking, enclosing with a frame, and displaying using a combination of the above.

According to the present disclosure, a user does not need to utter a character string that has already been inputted, and the accuracy of speech recognition can be improved by narrowing down a target phrase to be recognized.

These general and specific aspects may be implemented using a system, a method, and a computer program, and any combination of systems, methods, and computer programs.

DETAILED DESCRIPTION

First Embodiment

Hereinafter, an embodiment of the present disclosure will be described with reference to the drawings. Although a case in which data is inputted to an apparatus provided in a vehicle will be described in the embodiment, the present disclose is not limited to such an embodiment.

Figure 1:
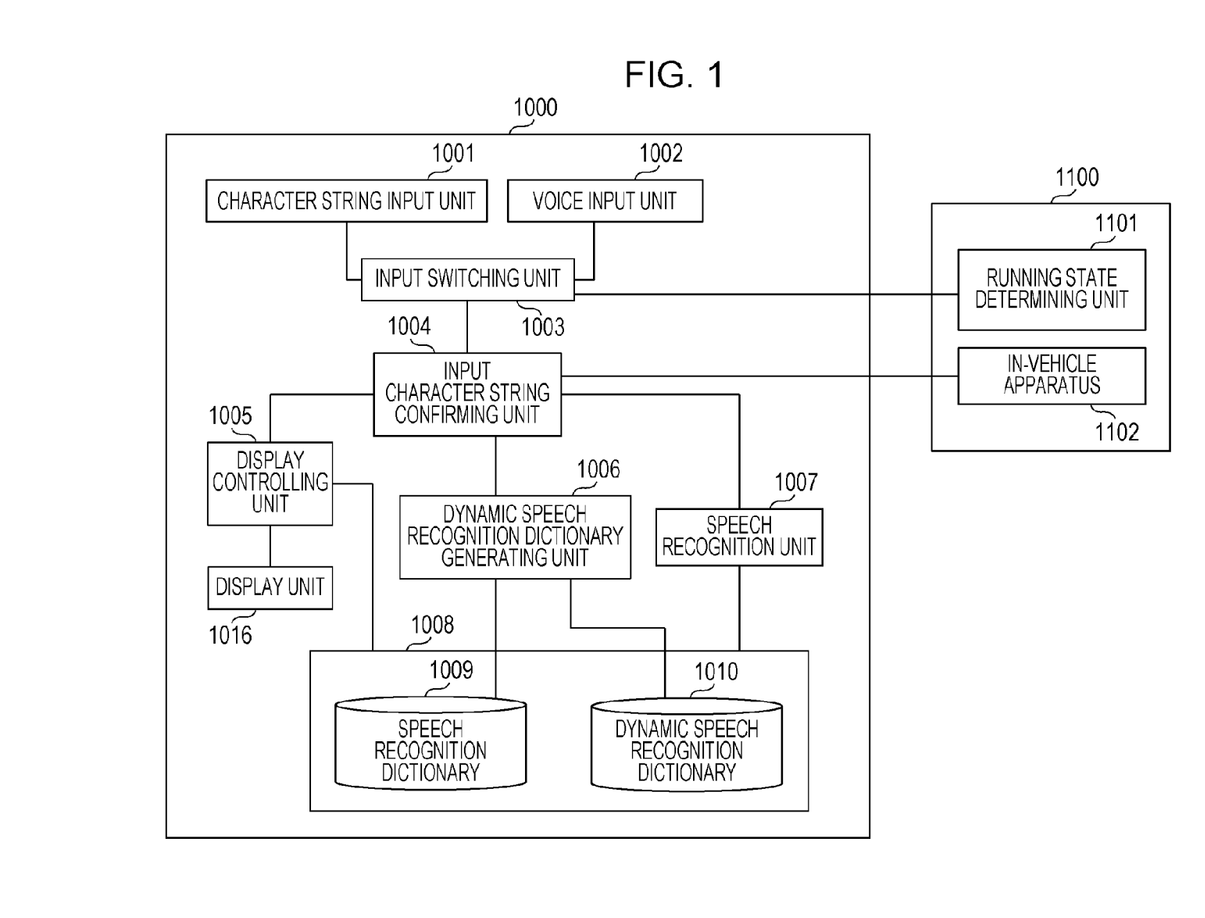
FIG. 1 is a block diagram illustrating a configuration of a data input device and a vehicle according to a first embodiment of the present disclosure.

FIG. 1 is a block diagram illustrating a configuration of a data input device and a vehicle according to a first embodiment of the present disclosure.

Referring to FIG. 1, a data input device 1000 is connected to an in-vehicle apparatus 1102, such as a car navigation system, installed in a vehicle 1100 and to a running state determining unit 1101 that determines the running state of the vehicle 1100.

The data input device 1000 includes two input units, namely, a character string input unit 1001 that is formed by a touch panel, a key input device, or the like and that accepts a manually inputted character string, and a voice input unit 1002 that is formed by a microphone or the like and that accepts voice input.

An input switching unit 1003 switches an input unit to be used by a user from the character string input unit 1001 to the voice input unit 1002 or from the voice input unit 1002 to the character string input unit 1001 on the basis of the result of a determination on the running state of the vehicle 1100 inputted from the running state determining unit 1101.

An input character string confirming unit 1004 confirms a character string inputted through the character string input unit 1001 as part of an input character string. The input character string confirming unit 1004 confirms an input character string on the basis of a character string that has been confirmed as part of the input character string and the result of speech recognition by a speech recognition unit 1007. The input character string confirming unit 1004 outputs a confirmed input character string to the in-vehicle apparatus 1102. The input character string confirming unit 1004 outputs voice data inputted through the voice input unit 1002 to the speech recognition unit 1007 and receives the result of speech recognition from the speech recognition unit 1007.

A dynamic speech recognition dictionary generating unit 1006 generates a dynamic speech recognition dictionary 1010 from a character string that has been confirmed by the input character string confirming unit 1004 as part of an input character string and a speech recognition dictionary 1009.

The speech recognition unit 1007 recognizes voice data inputted through the voice input unit 1002 by using a dictionary stored in a dictionary storing unit 1008.

The dictionary storing unit 1008 stores the speech recognition dictionary 1009 and the dynamic speech recognition dictionary 1010. The speech recognition dictionary 1009 is provided in advance in the data input device 1000. The dynamic speech recognition dictionary 1010 is dynamically generated by the dynamic speech recognition dictionary generating unit 1006.

A display controlling unit 1005 controls display on a display unit 1016. The display unit 1016 displays a character string confirmed by the input character string confirming unit 1004 and phrases in the dictionaries stored in the dictionary storing unit 1008 in accordance with the control of the display controlling unit 1005.

The running state determining unit 1101 installed in the vehicle 1100 determines the running state of the vehicle 1100 and outputs the result of the determination, such as "starting" and "stopping," to the input switching unit 1003. The in-vehicle apparatus 1102 is an apparatus, such as a car navigation system and a display audio system, that requires data input.

Figure 2:
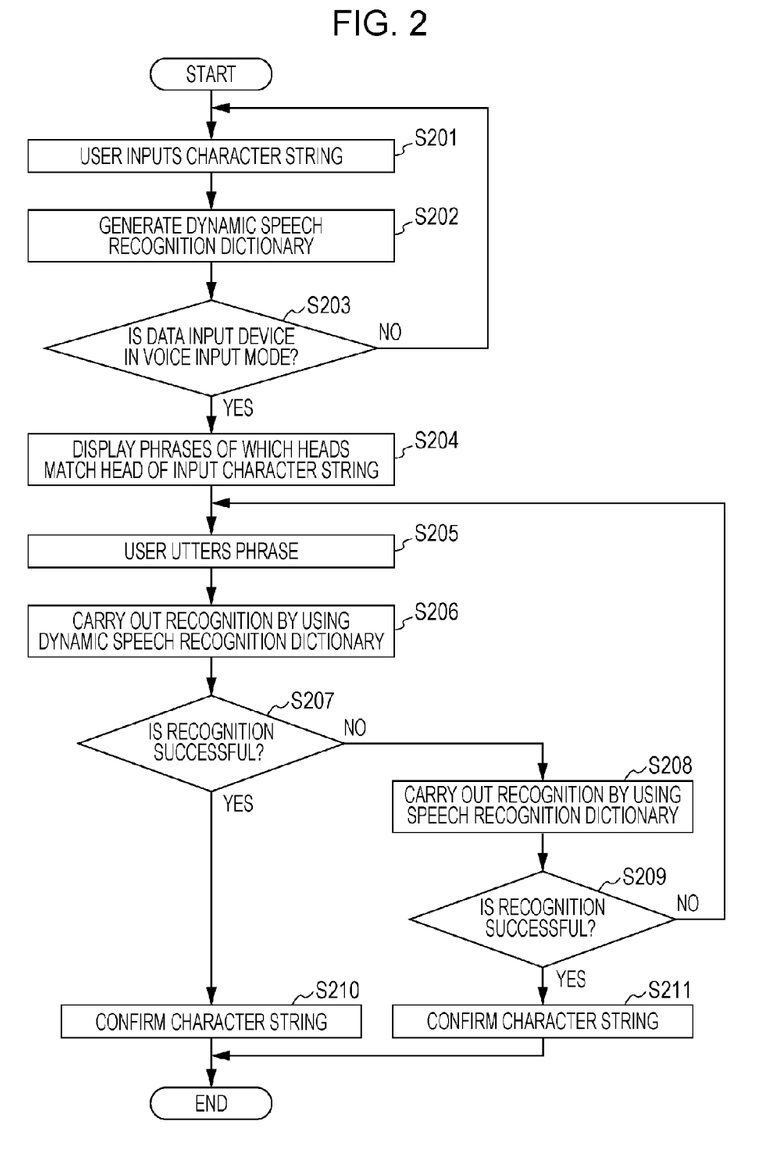
FIG. 2 is a flowchart illustrating an example of data input processing carried out by using the data input device according to the first embodiment of the present disclosure.

Hereinafter, an operation of the data input device 1000 configured as described above will be described. FIG. 2 illustrates an example of data input processing carried out by using the data input device 1000 according to the first embodiment of the present disclosure.

Referring to FIG. 2, a user inputs a character string by using the character string input unit 1001 (S201). The input character string confirming unit 1004 confirms the inputted character string as part of an input character string.

The dynamic speech recognition dictionary generating unit 1006 generates a dynamic speech recognition dictionary 1010 from the speech recognition dictionary 1009 on the basis of the character string that has been confirmed as part of the input character string (S202).

The dynamic speech recognition dictionary 1010 stores difference phrases, which are part of a plurality of phrases, stored in the speech recognitions dictionary 1009, of which heads match the head of the character string that has been confirmed as part of the input character string and which exclude a common phrase that is common among the plurality of phrases. Generation of the dynamic speech recognition dictionary 1010 will be described later with reference to another drawing.

The input character string confirming unit 1004 determines whether or not the data input device 1000 is in a voice input mode (S203). The voice input mode refers to a state in which the input switching unit 1003 has switched the input unit from the character string input unit 1001 to the voice input unit 1002.

If the data input device 1000 is not in the voice input mode (No in S203), processes in S201 and S202 are repeated. The dynamic speech recognition dictionary generating unit 1006 generates the dynamic speech recognition dictionary 1010 each time a character is inputted and part of the input character string is updated.

If the data input device 1000 is in the voice input mode (YES in S203), the display controlling unit 1005 displays, on the display unit 1016, phrases (hereinafter, referred to as input character string candidates) in the speech recognition dictionary 1009 of which heads match the head of the character string that has been confirmed by the input character string confirming unit 1004 as part of the input character string (S204).

The display controlling unit 1005 displays the input character string candidates with the difference phrases stored in the dynamic speech recognition dictionary 1010 being highlighted. The display controlling unit 1005 displays, on the display unit 1016, an indication that the data input device 1000 is in the voice input mode. The display controlling unit 1005 displays, on the display unit 1016, an indication that a character cannot be inputted through the character string input unit 1001.

The user utters a phrase that is necessary for confirming the input character string (S205).

The user utterance is inputted to the speech recognition unit 1007 through the voice input unit 1002. The speech recognition unit 1007 carries out recognition of the utterance by using the dynamic speech recognition dictionary 1010. The speech recognition unit 1007 carries out matching between the difference phrases stored in the dynamic speech recognition dictionary 1010 and the phrase uttered by the user (S206).

If the recognition of the user utterance is successful, or in other words, if the phrase uttered by the user matches a difference phrase (YES in S207), the input character string confirming unit 1004 confirms an input character string candidate that contains the difference phrase that has matched the phrase uttered by the user as the input character string (S210).

If the recognition of the user utterance is not successful, or in other words, if the phrase uttered by the user does not match any of the difference phrases (NO in S207), the speech recognition unit 1007 carries out recognition of the utterance by using the speech recognition dictionary 1009. The speech recognition unit 1007 carries out matching between the phrases stored in the speech recognition dictionary 1009 and the phrase uttered by the user (S208).

If the recognition of the user utterance is successful (YES in S209), the input character string confirming unit 1004 confirms the input character string on the basis of the result of the recognition and the character string that has been confirmed as part of the input character string.

If the recognition of the user utterance is not successful (NO in S209), the processes in and after S205 are repeated.

Figure 3:
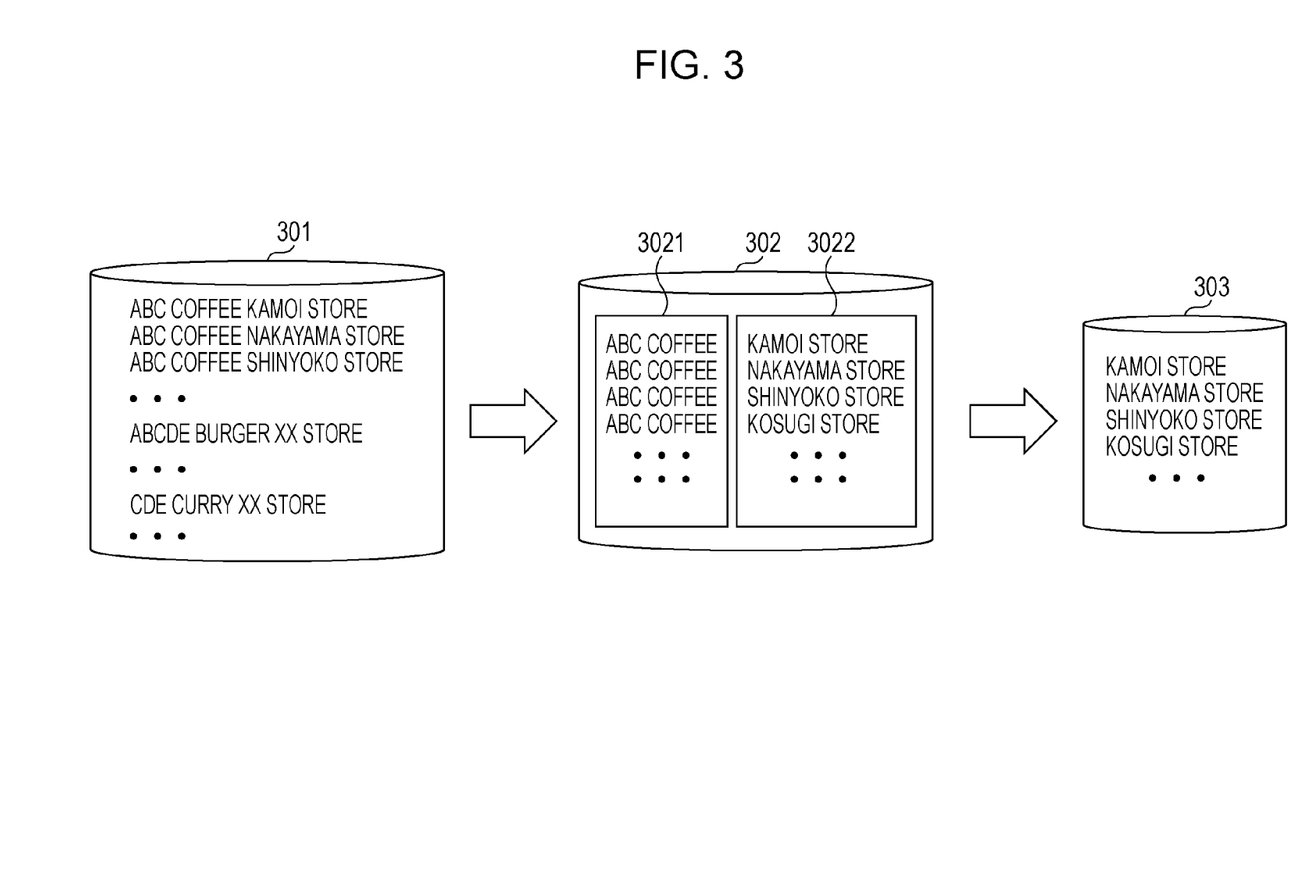
FIG. 3 is a conceptual diagram illustrating an example of a process of generating a dynamic speech recognition dictionary according to the first embodiment of the present disclosure.

FIG. 3 is a conceptual diagram illustrating an example of a process of generating the dynamic speech recognition dictionary 1010. In FIG. 3, phrases 301 are examples of the phrases stored in the speech recognition dictionary 1009. In the speech recognition dictionary 1009, phrases, such as "ABC Coffee Kamoi Store," that indicate specific store names are stored. In conventional speech recognition in which the dynamic speech recognition dictionary 1010 is not used, matching is carried out between these phrases and a phrase uttered by the user.

Phrases 302 are phrases which the dynamic speech recognition dictionary generating unit 1006 has extracted from the phrases 301 stored in the speech recognition dictionary 1009 when the character string "ABC" is inputted through the character string input unit 1001.

The dynamic speech recognition dictionary generating unit 1006 extracts, from the phrases stored in the speech recognition dictionary 1009, a phrase of which head matches the head of a character string inputted through the character string input unit 1001. The heads of the extracted phrases "ABC Coffee Kamoi Store," "ABC Coffee Nakayama Store," "ABC Coffee Shinyoko Store," and "ABC Coffee Kosugi Store" match the head of the inputted character string "ABC."

The dynamic speech recognition dictionary generating unit 1006 divides the extracted phrases 302 into a common phrase 3021 of "ABC Coffee", which is common among the plurality of phrases, and difference phrases 3022 that exclude the common phrase 3021. The dynamic speech recognition dictionary generating unit 1006 generates a dynamic speech recognition dictionary 1010, which is a new dictionary that stores only the difference phrases 3022. Phrases 303 are examples of the phrases stored in the dynamic speech recognition dictionary 1010 generated from the phrases 301 stored in the speech recognition dictionary 1009.

Figure 4:
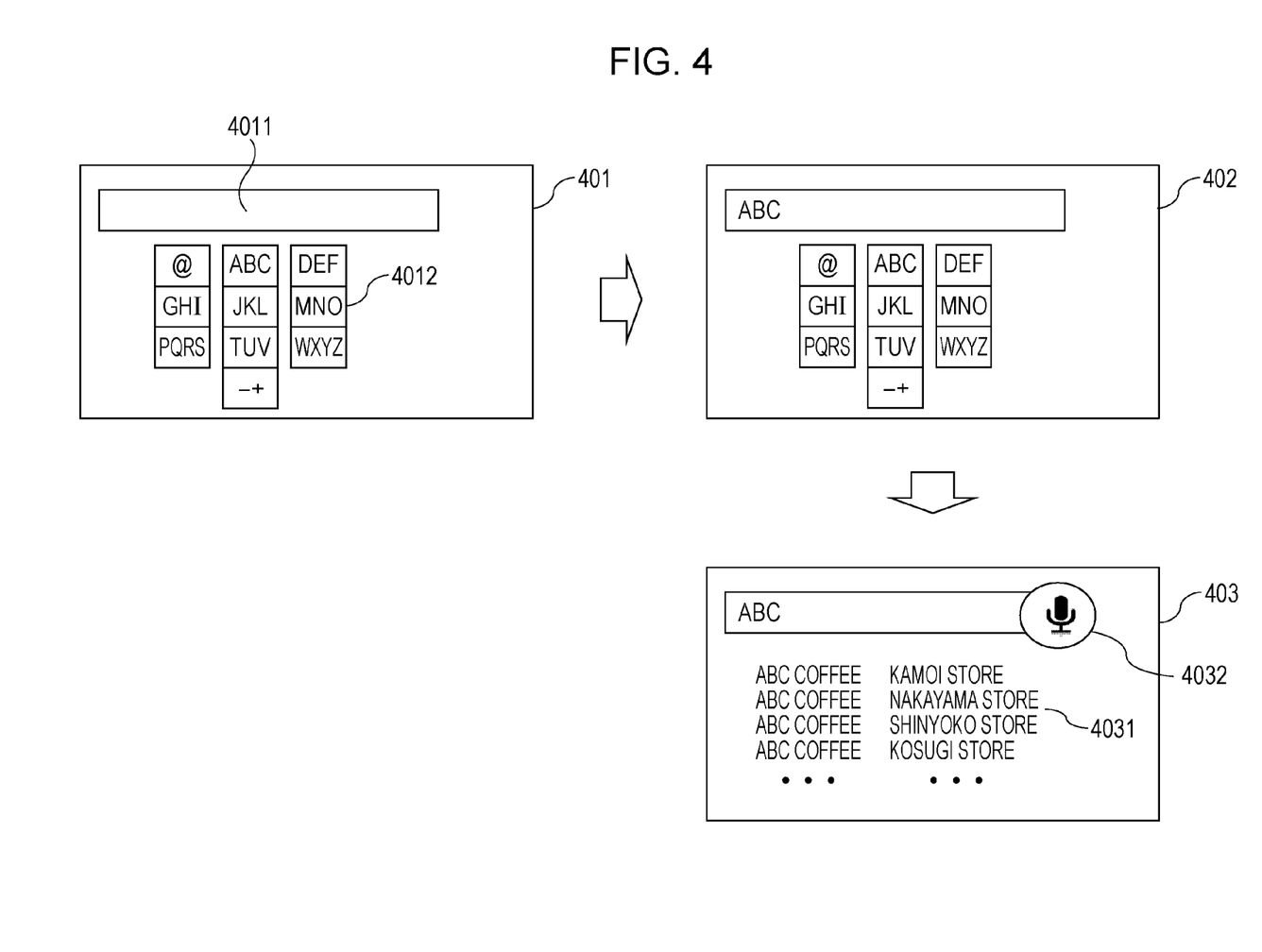
FIG. 4 illustrates an example of transitions of a display screen to be made when data is inputted by using the data input device according to the first embodiment of the present disclosure.

FIG. 4 illustrates an example of transitions of a display screen to be made when data is inputted by using the data input device according to the first embodiment of the present disclosure.

Although an example in which the display unit 1016 is constituted by a liquid crystal display panel and the character string input unit 1001 is constituted by a touch panel disposed so as to overlap the liquid crystal display panel is described, the display unit 1016 and the character string input unit 1001 are not limited to such examples.

A display screen 401 includes a touch panel input unit 4012, which corresponds to the character string input unit 1001, and an input character string display unit 4011 that displays a character string inputted through the touch panel input unit 4012. A character string displayed in the input character string display unit 4011 is a character string which the input character string confirming unit 1004 has confirmed as part of an input character string.

Here, an assumption is that the user is in a vehicle and has stopped the vehicle and the user wants driving directions to a nearby franchise store of "ABC Coffee." A display screen 402 illustrated in FIG. 4 illustrates a display screen in which the user has finished inputting a character string "ABC" through the touch panel input unit 4011.

When the user starts the vehicle, the running state determining unit 1101 outputs a determination result of "starting" to the input switching unit 1003. The input switching unit 1003 then switches the input unit from the character string input unit 1001 to the voice input unit 1002. The display screen 402 then transitions to a display screen 403.

Input character string candidates 4031 are then displayed on the display screen 403. The input character string candidates 4031 are phrases that are stored in the speech recognition dictionary 1009, of which heads match the head of the character string "ABC" that has been confirmed by the input character string confirming unit 1004 as part of the input character string. The input character string candidates 4031 include the common phrase "ABC Coffee," which is common among the plurality of phrases, and the difference phrases "Kamoi Store," "Nakayama Store," "Shinyoko Store," and "Kosugi Store." The input character string candidates 4031 are displayed with the difference phrases being highlighted in bold. This indicates that the user only needs to utter a highlighted difference phrase in order to confirm the input character string.

In the display screen 403, the touch panel input unit 4012 is not displayed, which indicates that a character cannot be inputted through the touch panel input unit 4012.

In the display screen 403, a microphone icon 4032 is displayed so as to indicate that the input unit has been switched to the voice input unit 1002, or in other words, so as to indicate that the data input device 1000 is in the voice input mode.

When the user utters "Kamoi Store" while the display screen 403 is displayed, the speech recognition unit 1007 carries out the recognition of the utterance by using the dynamic speech recognition dictionary 1010. The speech recognition unit 1007 then recognizes that the uttered phrase is "Kamoi Store." The input character string confirming unit 1004 confirms the character string input candidate "ABC Coffee Kamoi Store" that includes "Kamoi Store," which is the result of the speech recognition, as the input character string. The input character string confirming unit 1004 outputs the confirmed character string "ABC Coffee Kamoi Store" to the in-vehicle apparatus 1102.

As described thus far, with the data input device and the data input method according to the first embodiment of the present disclosure, speech recognition is carried out by using the dynamic speech recognition dictionary that stores difference phrases excluding a common phrase, and thus a user does not need to utter a phrase that has already been inputted. In addition, the accuracy of speech recognition can be improved by narrowing down a target phrase to be recognized to difference phrases excluding a common phrase.

It is to be noted that a single character is also referred to as a character string in the first embodiment. Although the boldface has been described as an example of highlighting, highlighting may include displaying a given character string in a different color, in a different size, or in a different typeface, blinking, enclosing with a frame, and displaying using a combination of the above.

In addition, the character string input unit 1001 and the display unit 1016 may also be used as an input device and an output device provided in an in-vehicle apparatus.

Furthermore, the data input device according to the first embodiment of the present disclosure may be implemented through dedicated hardware or may be implemented by recording a program for realizing the function into a computer readable storage medium and by loading the program recorded in the storage medium onto a computer system so as to be executed by the computer system.

INDUSTRIAL APPLICABILITY

The data input device and the data input method according to the present disclosure can be used effectively as a data input device and a data input method for an in-vehicle apparatus, such as a car navigation system.

What is claimed is:

1. A data input device that includes two inputs including a character string input that accepts a character string and a voice input that accepts voice input, a display that displays the character string, and a speech recognition dictionary, the data input device comprising:
    a dynamic speech recognition dictionary generator which, in operation, extracts phrases of which heads match a head of the character string inputted through the character string input from phrases stored in the speech recognition dictionary, and generates a dynamic speech recognition dictionary that stores difference phrases, the difference phrases each being part of an extracted phrase excluding a common phrase that is common among the extracted phrases;
    a display controller which, in operation, displays the difference phrases of an input character string candidate, the difference phrases being highlighted on the display and excluding the common phrase;
    a speech recognizer which, in operation, carries out speech recognition of voice inputted through the voice input by using the dynamic speech recognition dictionary;
    an input character string confirmer which, in operation, confirms the input character string candidate that includes a difference phrase recognized by the speech recognizer as an input character string; and
    an input switcher which, in operation, switches between the character string input and the voice input based on a running state of a vehicle,
    wherein, in a case of receiving a changed state of the vehicle from stopping to starting before a whole character string is finished inputting, the input switcher switches from the character string input to the voice input, the display controller displays the difference phrases of the input character string candidate with the common phrase that has already been confirmed by the character string input, the difference phrases being highlighted on the display, and the input character string confirmer confirms the input character string candidate using the highlighted difference phrase recognized by the speech recognizer as the input character string, and
    at least one of the dynamic speech recognition dictionary generator, the display controller, the speech recognizer and the input character string confirmer is included in a processor.

2. The data input device according to claim 1,
    wherein the speech recognizer carries out speech recognition by sequentially using the dynamic speech recognition dictionary and the speech recognition dictionary.

3. The data input device according to claim 1,
    wherein the dynamic speech recognition dictionary generator generates the dynamic speech recognition dictionary each time a character is inputted through the character string input.

4. An in-vehicle apparatus, comprising:
    the data input device according to claim 1.

5. A data input method for a data input device that includes a character string input that accepts a character string, a display that displays the character string, a voice input that accepts voice input, and a speech recognition dictionary, the data input method comprising:
    extracting phrases of which heads match a head of the character string inputted through the character string input from phrases stored in the speech recognition dictionary, and generating a dynamic speech recognition dictionary that stores difference phrases, the difference phrases each being part of an extracted phrase excluding a common phrase that is common among the extracted phrases;
    displaying the difference phrases of an input character string candidate, the difference phrases being highlighted on the display and excluding the common phrase;
    carrying out speech recognition of voice inputted through the voice input by using the dynamic speech recognition dictionary;
    confirming the input character string candidate that includes a difference phrase recognized through the speech recognition as an input character string; and
    switching between the character string input and the voice input based on a running state of a vehicle,
    wherein, in a case of receiving a changed state of the vehicle from stopping to starting before a whole character string is finished inputting, the character string input is switched to the voice input, the difference phrases of the input character string candidate are displayed with the common phrase that has already been confirmed by the character string input, the difference phrases being highlighted on the display, and the input character string candidate is confirmed using the highlighted difference phrase recognized through the speech recognition as the input character string.

6. A non-transitory, tangible computer-readable storage medium storing a program for a data input device that includes a character string input that accepts a character string, a display that displays the character string, a voice input that accepts voice input, and a speech recognition dictionary, the program, when executed by a computer, causing the computer to perform operations comprising:
    extracting phrases of which heads match a head of the character string inputted through the character string input from phrases stored in the speech recognition dictionary, and generating a dynamic speech recognition dictionary that stores difference phrases, the difference phrases each being part of an extracted phrase excluding a common phrase that is common among the extracted phrases;
    displaying the difference phrases of an input character string candidate, the difference phrases being highlighted on the display and excluding the common phrase;

carrying out speech recognition of voice inputted through the voice input by using the dynamic speech recognition dictionary;

confirming the input character string candidate that includes a difference phrase recognized through the speech recognition as an input character string; and switching between the character string input and the voice input based on a running state of a vehicle, wherein, in a case of receiving a changed state of the vehicle from stopping to starting before a whole character string is finished inputting, the character string input is switched to the voice input, the difference phrases of the input character string candidate are displayed with the common phrase that has already been confirmed by the character string input, the difference phrases being highlighted on the display, and the input character string candidate is confirmed using the highlighted difference phrase recognized through the speech recognition as the input character string.

* * * * *